United States Patent [19]

Tong

[11] Patent Number: 4,916,345
[45] Date of Patent: Apr. 10, 1990

[54] FLAT STATOR WINDING FOR ALTERNATOR STARTER

[75] Inventor: Andrew K. Tong, Rochester, Mich.

[73] Assignee: Chrysler Motors Corporation, Highland Park, Mich.

[21] Appl. No.: 240,871

[22] Filed: Sep. 2, 1988

[51] Int. Cl.⁴ .............................................. H02K 3/04
[52] U.S. Cl. ...................... 310/208; 310/71; 310/179; 310/184; 310/201; 310/254
[58] Field of Search ............ 310/268, 156, 208, 171, 310/113, 179, 180, 184, 45, 71, 89, 202, 201, 206, 42, 207, 254; 290/46

[56] References Cited

U.S. PATENT DOCUMENTS

| | | |
|---|---|---|
| 1,250,718 | 12/1917 | Turbayne . |
| 1,325,677 | 12/1919 | Midgley . |
| 2,184,236 | 11/1938 | Heintz . |
| 3,283,190 | 11/1966 | Applegate ............................ 310/268 |
| 4,194,743 | 3/1980 | Ohsawa ................................ 310/268 |
| 4,219,739 | 8/1980 | Greenwall . |
| 4,319,152 | 3/1982 | Van Gils ............................. 310/268 |
| 4,340,833 | 7/1982 | Sudo .................................... 310/207 |
| 4,629,948 | 12/1986 | Tassinario ........................... 310/113 |
| 4,645,961 | 2/1987 | Malsky . |
| 4,794,293 | 12/1988 | Fujisaki .............................. 310/268 |

FOREIGN PATENT DOCUMENTS

| | | | |
|---|---|---|---|
| 1965355 | 8/1971 | Fed. Rep. of Germany ...... | 310/268 |
| 0013633 | 1/1980 | Japan .................................. | 310/268 |
| 0888685 | 1/1962 | United Kingdom ................ | 310/268 |

Primary Examiner—R. Skudy
Attorney, Agent, or Firm—Mark P. Calcaterra

[57] ABSTRACT

A stator winding assembly for a dual purpose alternator starter for an automotive vehicle designed to be positioned between the engine and transmission. The stationary ironless stator assembly has flat copper windings embedded in an insulation matrix. These windings undulate from the perimeter of the disc towards the interior of the disc as each winding forms a single pass around the ring shaped disc. Each winding has a plurality of outwardly directed tabs spaced apart. These tabs are connected to adjacent winding tabs so as to reduce overall winding resistance.

9 Claims, 5 Drawing Sheets

FLAT STATOR WINDING FOR ALTERNATOR STARTER

BACKGROUND OF THE INVENTION

1. Field of the Invention

The present invention relates to the combination of an electrical motor and generator, and more particularly to a stator winding for a machine that performs both motor and generator functions.

2. Discussion of Related Art

In general, an electric machine can be operated as a generator and vice versa. These functions of a motor or a generator can be selected by whether power is delivered to the unit from an external source of electrical power or whether the unit is mechanically driven by an external source of mechanical energy such as an internal combustion engine in an automobile which wold allow the unit to act as a generator to supply electrical energy.

The subject invention comprises a structure particularly adapted for automotive application which permits the combination of the starter motor function and the generator (generic DC or AC) or (AC) function in a unique package to take advantage of the motor/generator characteristics described above. The subject invention is specifically designed for use in an alternator starter such as described in commonly assigned U.S. Patent Application No. 07/240,965, entitled Alternator Starter by Crall and Carter filed on Sept. 2, 1988 and herein expressly incorporated by reference.

SUMMARY OF THE INVENTION

It is an object of the present invention to provide a flat non-magnetic ironless stator having an improved laminated insulated winding arrangement.

It is another object of the present invention to provide a flat winding assembly having improved alignment tabs to simplify orientation of the windings with the stator assembly.

It is another object of the present invention to provide a stator winding assembly having externally connected layer interconnections.

The alternator starter having a stator winding assembly according to the present invention is primarily designed to replace the ring gear which is positioned between the conventional engine and a transmission in a typical automotive drive train assembly. The invention may also be adapted to be used in a machine positioned about any power shaft. One preferred embodiment of the invention is used in an automobile.

In a conventional engine-transmission drive train assembly, the ring gear is removed. Bolted to the end of the crankshaft is a pair of offset magnetically permeable disc shaped metal plates. When bolted together at the center to the crankshaft, these plates form an annular channel between them.

One of these plates has a set of ring shaped switch contact members mounted on one side of the plate. On the other side of this plate are positioned a series of flat rare earth metal alloy permanent magnets. The outer periphery of the outer plate may, in turn, be bolted to the torque converter cover of a conventional automatic transmission torque converter or otherwise connected to the drive train.

Disposed between the two plates, within the channel, and mounted stationary to the vehicle engine is an ironless three phase stator assembly according to the present invention. The stator assembly is a generally ring shaped molded disc structure having a plurality of flat windings generally stamped from copper sheet and embedded in a polymeric insulation matrix such as fiberglass and resin windings. These flat copper windings are laminated together and insulated from one another and positioned in a stacked relationship within the molded stator assembly. Each winding forms a single pass around the ring shaped disc and each winding undulates from the outer perimeter of the ring shaped disc to the inner diameter as it forms its single pass. A plurality of windings are externally connected at their ends in series to form each of the phase winding sets in the three phase stator assembly.

The unique construction of each winding according to the present invention enhances the insulation characteristics between windings while also facilitating accurate stamping and assembly. The terminal ends of each winding are directed radially outward so that the windings can be laminated together with the insulation matrix and then electrically interconnected after the complete stator is formed. This greatly simplifies the lamination process and produces more uniform insulation characteristics between the windings. Each winding also has a plurality of symmetrically spaced radial locating tabs which are used to radially position the winding during automated assembly operations.

Each winding begins and ends with a radially outwardly directed terminating tab. These tabs are adjacent to one another. In a set having four windings, two pairs of identical stamped windings are used. One pair is formed with the one of the tabs positioned along the midpoint between two radial portions. The other pair of windings is formed with one of the tabs being a simply radial extension of the radial portion of the winding. One of each pair of windings is reversed so as to position a single tab of each winding over a tab on the adjacent winding when the two pairs of windings are placed together in stacked alignment. The symmetrically spaced locating tabs are also positioned in stacked pairs when the four windings in a set are properly aligned.

A phase winding set of four windings will then have three pairs of overlapping terminating tabs bounded on either side by two single external terminating tabs. The intermediate three sets of two overlapping tabs are externally electrically connected together so that the phase winding set is connected in series.

This construction simplifies the application of the glass and resin insulation lamination layers between the winding layers. The terminating tabs both internal and external need not be connected together to form the complete phase winding set until the final assembly stage. This design simplifies construction as well as minimizes the potential for insulation breakdown during subsequent stator operation.

The stator winding sets may be connected together in a three phase delta or wye arrangement or they may be used independently. One of the three phase winding sets may be utilized to produce DC output to charge the vehicle battery as well as energize appropriate DC circuits within the vehicle. The other two phase windings may remain unused or may be utilized for other purposes such as to produce a regulated AC output for various devices requiring an AC supply. Sufficient output is produced by the present invention so that a single phase may be utilized to provide all DC requirements of a motor vehicle as presently in use.

In other words, present design requirements in automobiles are within the output production capability of a single phase winding of an alternator starter having the winding assembly according to the present invention. Alternatively, all three phases of the stator may be coupled via a full wave rectifier circuit into an appropriate voltage regulation circuit to provide total DC output. In this case, the achievable DC current output far exceeds the electrical requirements in a typical automobile.

DETAILED DESCRIPTION OF THE PREFERRED EMBODIMENT

Figure 1:
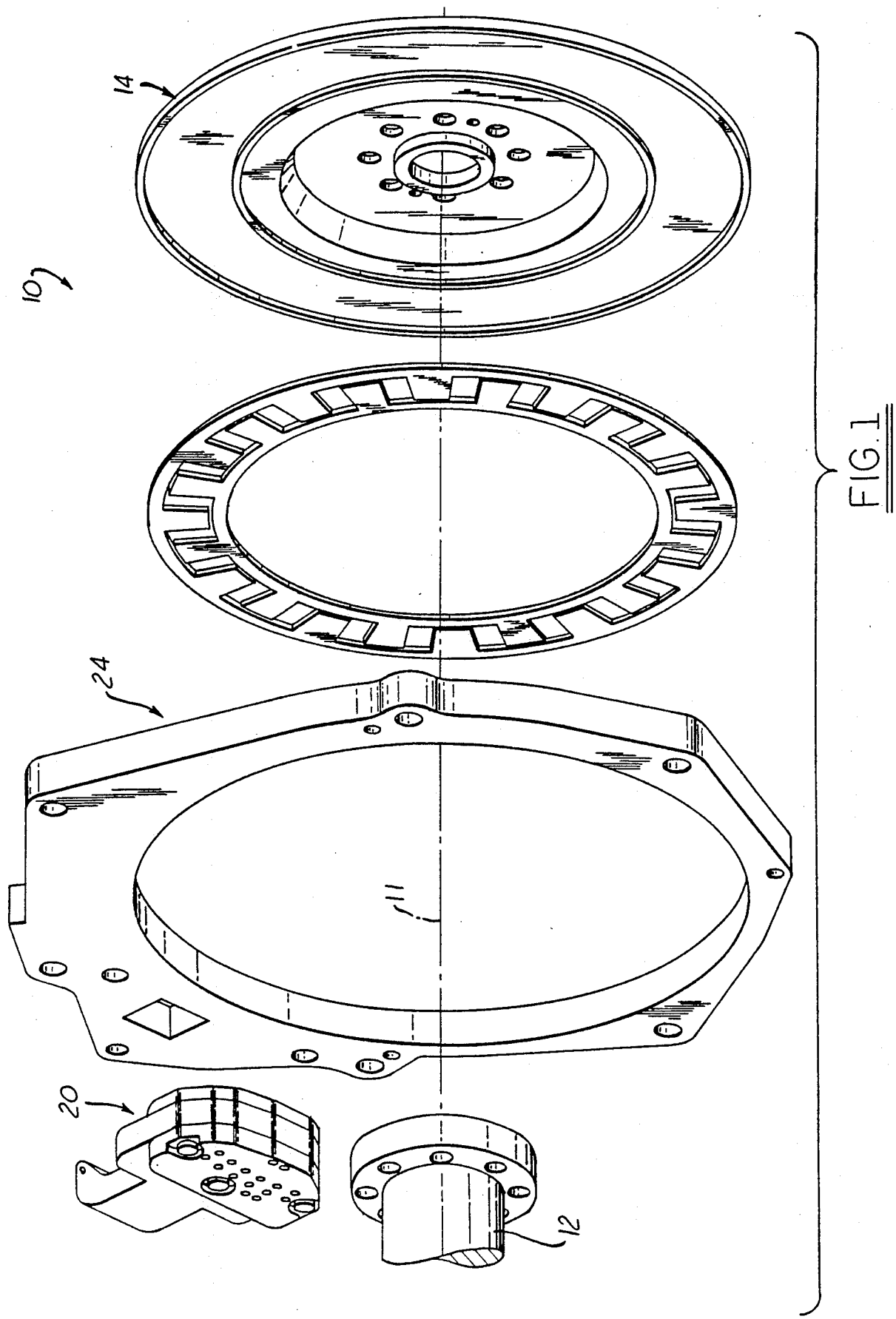
FIGS. 1 and 2 present an exploded perspective view of the alternator starter using the winding assembly according to the present invention showing the arrangement of the various parts of the alternator starter disposed between an engine and transmission of a motor vehicle.
Figure 2:
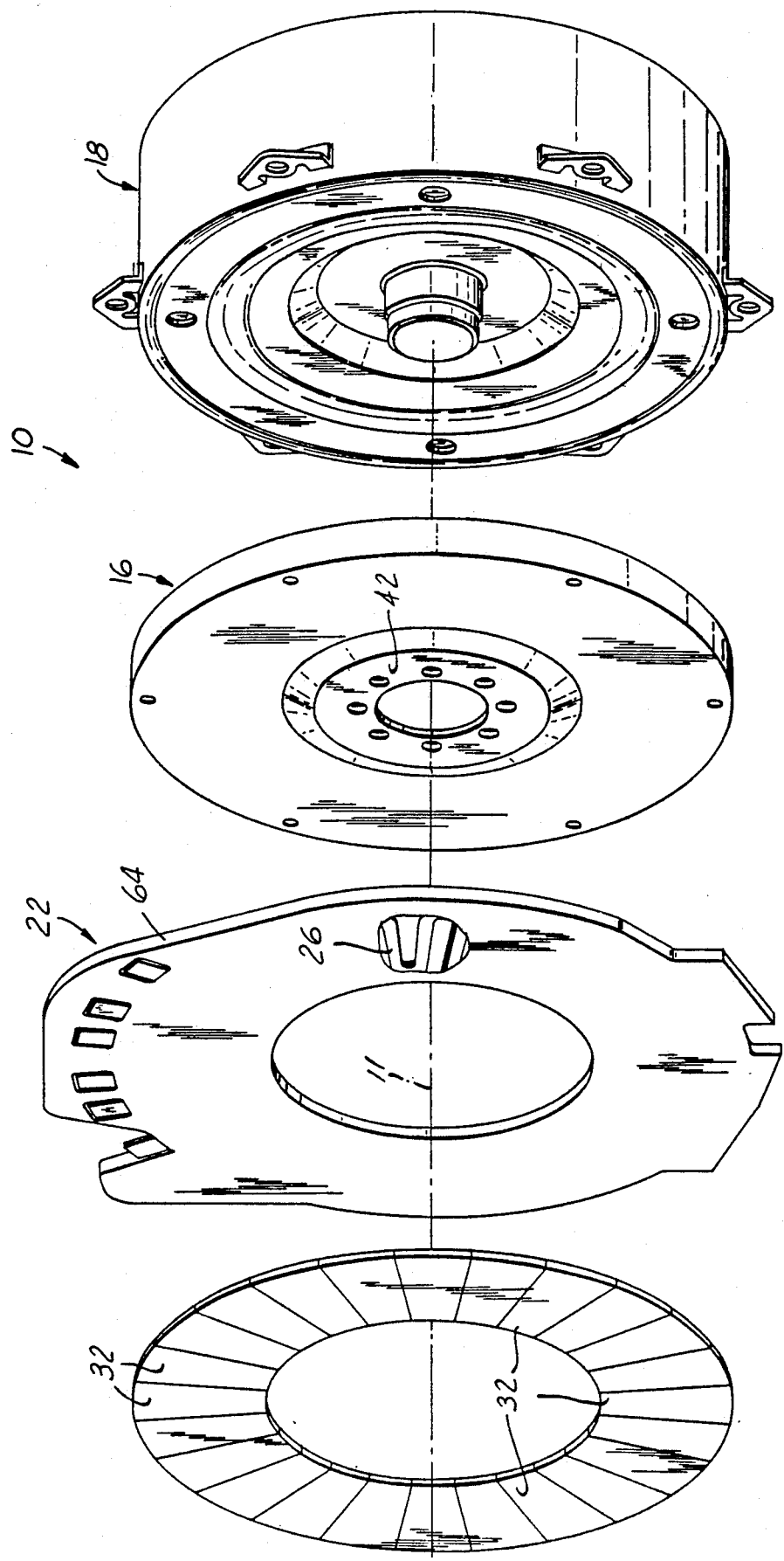

Referring now to the drawings, FIGS. 1 and 2 show an exploded view of an alternator starter having a stator winding assembly according to a preferred embodiment of the present invention. The alternator starter 10 is located between the vehicle engine and transmission. Although the engine is not shown, it is located on the left end of the central axis 11 in FIG. 1. The transmission, also not shown, is oriented to the right end of the central axis 11 as continued in FIG. 2. The engine power shaft, in this embodiment crankshaft 12, is bolted to a switch and magnet mounting plate 14 and a combination magnetic return and torque converter mounting plate 15. The torque converter mounting plate 16 is, in turn, bolted to a torque converter cover 18. These two plates 14 and 16 therefore rotate with the engine crankshaft 12.

A brush assembly 20 is mounted on a brush and stator mounting plate 24. A stator winding assembly 22 according to the present invention is also mounted to brush and stator mounting plate 24. The brush and stator mounting plate 24 is bolted to the engine block (not shown) and mounted in fixed position also with respect to the transmission housing. Therefore, the stator winding assembly 22 remains stationary when the plates 14 and 16 rotate with the crankshaft 12 during engine operation.

The brush and stator mounting plate 24 serves to provide a support for the brush assembly 20 and the non-magnetic stator winding assembly 22. It also provides a space to mount the remainder of the alternator starter components between the engine and transmission. The mounting plate 24 adapts the alternator starter onto an existing conventional engine and transmission combination. However, if the engine and transmission were redesigned with the present invention in mind, they would likely take on a different shape to accommodate the present invention in such a way as to eliminate the necessity for the brush and stator mounting plate 24. Since such development has not yet occurred, the brush and stator mounting plate 24 provides a communication link between the brush assembly 20 and the remainder of the alternator starter assembly.

A further detailed description of the alternator starter and its various subassemblies is provided in commonly assigned U.S. Patent Application entitled Alternator Starter by Crall and Carter which was filed on the same day as the subject application, which is herein incorporated by reference. The following description pertains to the stator winding assembly 22, according to the present invention, for use in this alternator starter.

The stator winding assembly 22 is comprised of one or more sets of flat conductive windings 26 laminated together. The windings 26 may be formed by a wire electrical discharge machine (EDM) cutting process, a stamping process, or other suitable process. Each winding 26 is cut out or stamped from a flat conductive sheet such as flat copper material of about 0.016 inches in thickness. The flat conductor windings 26 are then coated with a thin laminating insulation layer.

Figure 3:
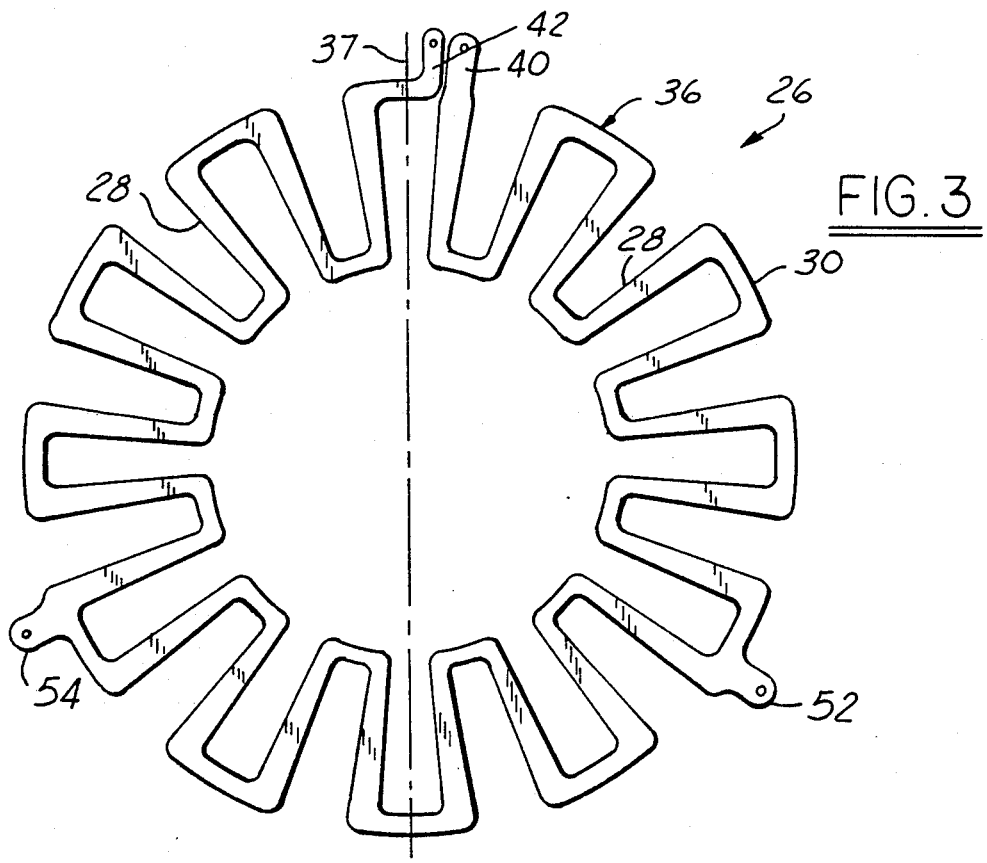
FIG. 3 is a plan view of an end winding.
Figure 4:
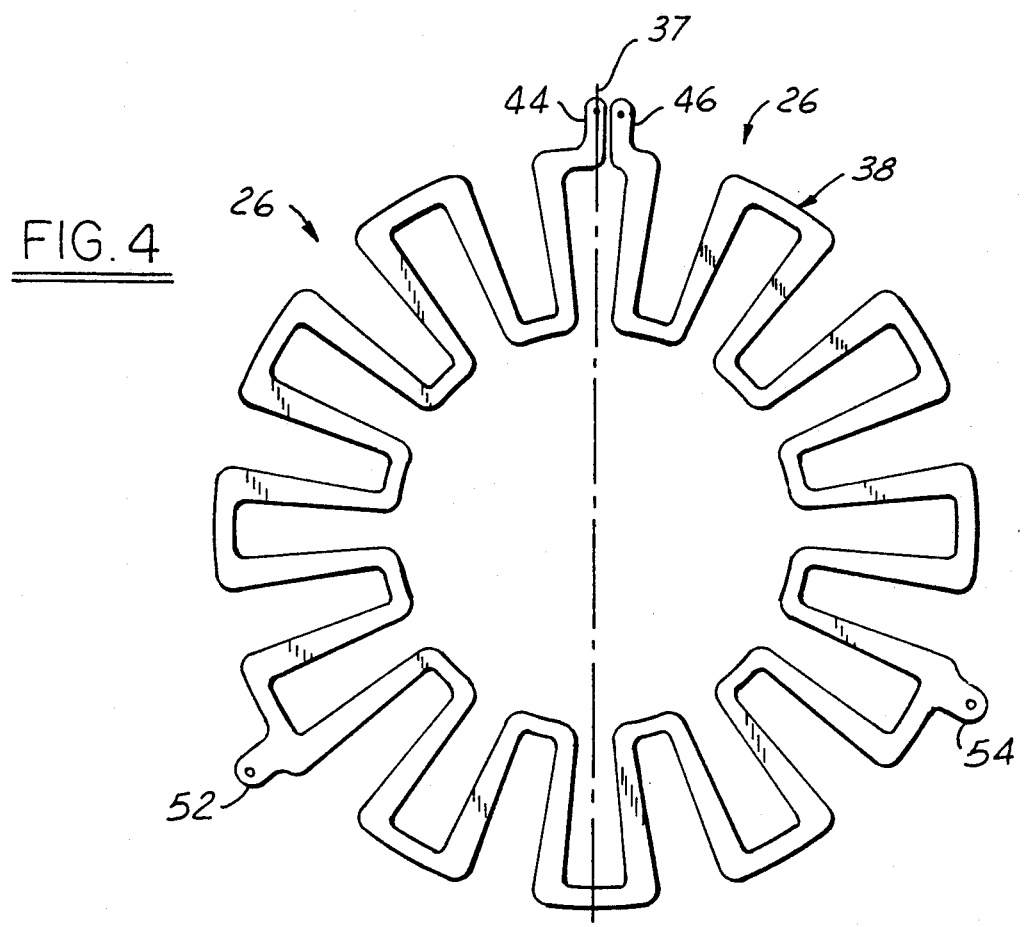
FIG. 4 is a plan view of an intermediate winding.

As shown in FIGS. 3 and 4, each flat conductor winding 26 has a planar, serpentine ring shape. Each winding has twenty-four straight portions 28 passing radially from the outer perimeter of the ring to the inner perimeter of the ring and vice versa connected together in series by arcuate portions 30 as the winding undulates in a serpentine fashion forming the ring. These straight portions 28 are equiangularly spaced. The number of the straight portions 28 and the arcuate portions 30 is dictated by the number of permanent magnets 32 (see FIG. 2) in the alternator starter design. In the preferred embodiment shown, there are twenty-four straight portions and twenty-four arcuate portions as there are twenty-four permanent magnets 32 as shown in FIG. 2.

Figure 5:
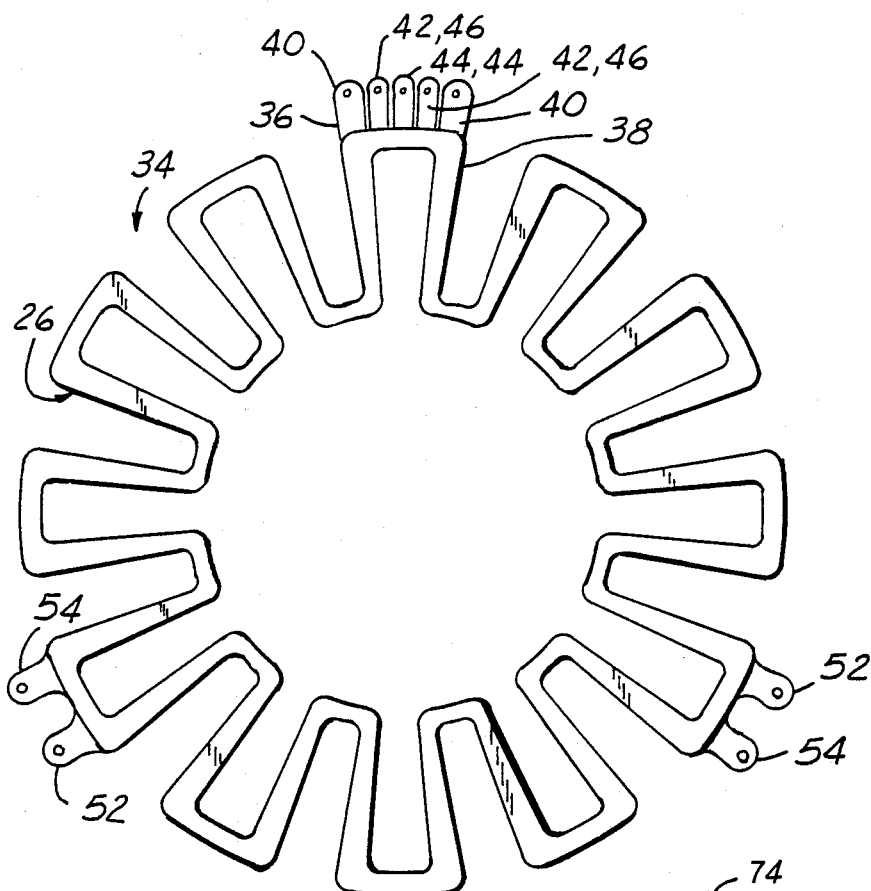
FIG. 5 is a plan view of a single phase set of stator windings according to the present invention.

An axial plan view of a set 34 of four windings 26 axially stacked together is shown in FIG. 5. This set 34 of windings 26 is made up of a pair of end windings 36 and a pair of intermediate windings 38 sandwiched between the pair of end windings 36.

The end windings 36 and the intermediate windings 38 differ only in the radial placement of the terminating tabs. In the end winding 36 shown in FIG. 3, one end terminates in tab 40 which is simply a radial extension of one straight portion 28. The other end terminates in tab 42 which is a portion on adjacent arcuate portion 30 which is bent radially outward and spaced from radial axis 37 by 3.75 degrees. Thus terminating tab 42 is also radially displaced from tab 40 by 3.75 degrees.

When one of the pair of end windings 36 is flipped over about radial axis 37 and positioned on top of the other end winding 36 in stacked alignment, the angles between axis 37 and tabs 40 and 42 will be 15 degrees and 7.5 degrees respectively.

The intermediate winding 38, shown in FIG. 4, has one of its ends terminating in tab 44 which extends radially outward from the center of one of the arcuate portions 30 along radial axis 37. The other end terminates in tab 46 which is offset from tab 44 by 3.75 degrees and extends outward radially from the same arcuate portion 30. When one intermediate winding 38 is flipped over about radial axis 37 and positioned on top of another intermediate winding 38 in stacked alignment, tab 44 on one winding will be axially aligned with tab 46 on the other.

A pair of intermediate windings, so aligned, may be sandwiched between a pair of flipped over end windings 36 as shown in FIG. 5 to form the stacked arrangement or set 34. The three intermediate pairs of tabs in stacked alignment will be 3.75 degrees apart, and the two end terminal tabs 40 will be 15 degrees apart. The three pairs of intermediate tabs may then be connected together to connect the four windings in series to complete the phase winding set 34 assembly.

Figure 6:
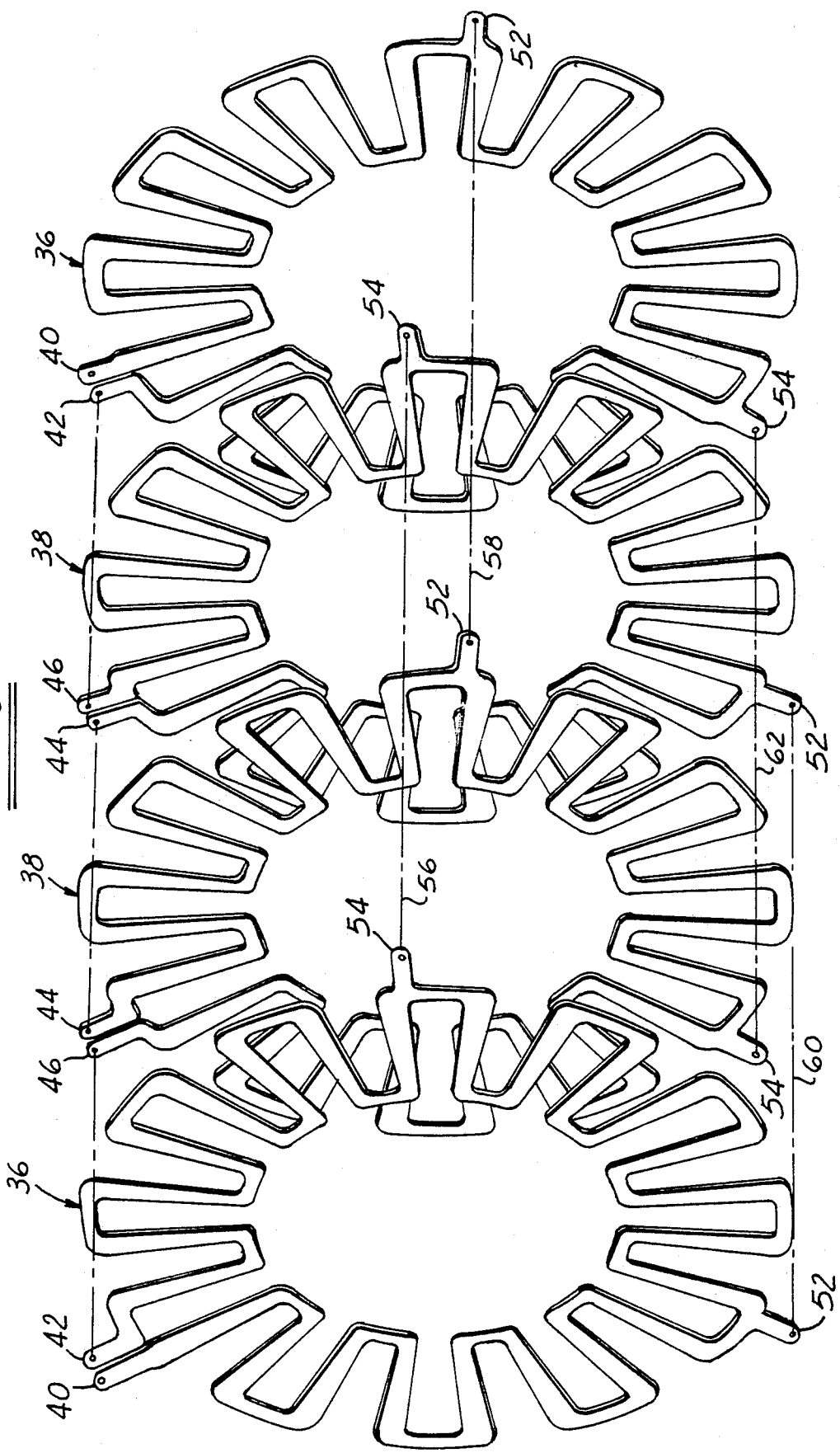
FIG. 6 is an exploded view of the single phase set of stator windings according to the present invention shown in FIG. 5.

Each end winding 36 has a pair of spaced-apart locator tabs 52 and 54, each projecting radially outward from an arcuate portion 30. Locator tabs 52 and 54 are spaced relative to radial axis 37 (FIG. 3) such that when a pair of end windings 36 are flipped about axis 37 and axially stacked, tabs 52 and 54 will be spaced apart as shown in FIG. 5. Phantom lines 56, 58, 60 and 62 in FIG. 6 show the overlapping arrangement of locator tabs 52 and 54 within a winding set 34.

It can be appreciated that locator tabs 52 and 54 are alignment means and could take the form of tabs, pinholes, notches, etc. in order to provide alignment means.

During assembly of each set 34, each winding 36 and 38 is insulated from one another by fiberglass and resin layers. The result is an insulative matrix body 64 (FIG. 2) having at least one set 34 laminated therein.

Figure 7:
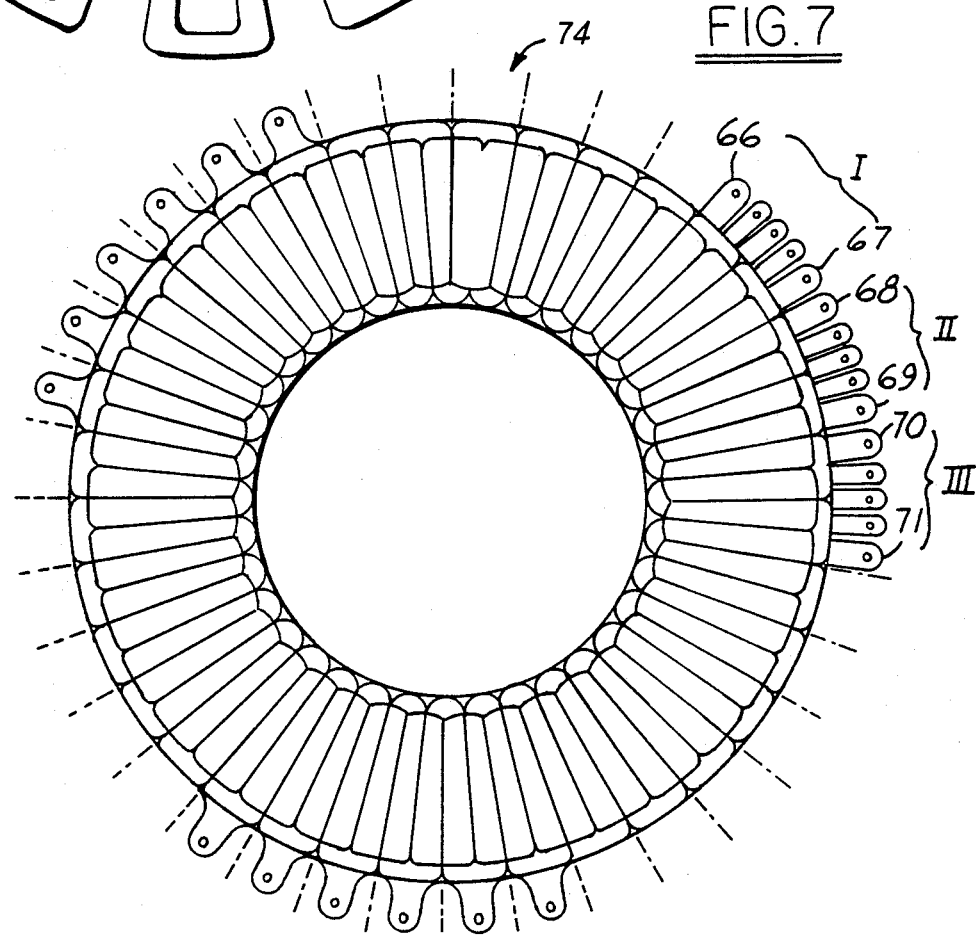
FIG. 7 is a plan view of an assembled three phase stator winding assembly having three sets of windings according to the present invention.

A plurality of sets 34 may then be positioned in stacked alignment, shifted 20 degrees from one another to produce a multi-phase winding assembly such as the three phase winding assembly 74 as shown in FIG. 7.

In the embodiment shown in FIGS. 2 and 7, the stator winding assembly 22 comprises three phase windings. Each phase comprises a single phase winding set 34. Each winding set 34 is physically offset by 20 degrees of rotation. Accordingly, end tab pairs 66 and 67, 68 and 69, 70 and 71 correspond to single phase winding sets 34 for phases I, II, and III in assembly 74 in the three phase stator winding assembly 22. The 20 degree rotation centers the straight portions 28 of each set of windings from the adjacent phase winding straight portions 28 by an arc of about 5 degrees.

The width of the straight portions 28 of each winding is slightly less than an arc of 5 degrees. Therefore, the space between adjacent windings, when viewed axially, is minimized and no overlap exists. This ensures that conductor surface is maximized to minimize winding resistance. In addition, this construction places a maximum amount of conductor winding within the path of the magnetic flux emanating from the permanent magnets 32.

When functioning as an alternator, for example, as the engine crankshaft turns, this, in turn, turns switch and magnet mounting plate 14 and mounting plate 16 which causes permanent magnets 32 to pass by straight portions 28 of windings 26 in stator winding assembly 22. The magnetic flux produced by the magnets 32 which cuts the conductor windings 26 of stator winding assembly 22, causes current of alternating polarity to flow through the stator winding assembly 22 producing an AC output in the three phase windings of the preferred embodiment shown. The output from each phase or winding set may be rectified and controlled separately, or one phase may be used to provide DC through rectification while the other two sets or phases may be used to provide AC into loads that do not require DC for their operation. These AC loads do not have to operate at the same voltage as do the DC loads, nor at the same AC voltage as each other.

From the above description, it is seen that this invention provides a unique winding assembly design for an alternator starter for an internal combustion engine having an ironless stator. However, the invention may also be advantageously used in other motor and generator applications requiring flat windings. The present invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than specifically described.

What is claimed is:

1. A stator winding assembly for use in an electrical machine adapted for use as an integral dual purpose motor and generator having a rotatable power shaft, said assembly comprising:
    a generally flat ring shaped stator body lying about said shaft in a plane perpendicular to said shaft, said ring shaped stator body having an inside perimeter and an outside perimeter encircling said shaft and at least one generally flat conductive metal winding a set of winding within said stator body having a beginning end and a terminal end, said winding undulating radially between said outer perimeter and said inner perimeter as said winding encircles said shaft in said plane making a single pass around said ring shaped stator body, said winding having an alignment means such as a plurality of spaced apart outwardly directed tabs for aligning said winding within said body.

2. The assembly according to claim 1 wherein said ring shaped stator body further comprises a set of windings within said stator body each having a beginning end and a terminal end, each of said flat windings undulating radially between said outer perimeter each of said windings encircles said shaft.

3. The assembly according to claim 1 wherein said set of windings further comprises:
    a first winding having a beginning end and a terminal end, its beginning end terminated on a first tab;
    a second winding having a beginning end and a terminal end, its beginning end attached to the terminal end of said first winding;
    a third winding having a beginning end and a terminal end, its beginning end attached to the terminal end of said second winding; and
    a fourth winding having a beginning end and a terminal end, its beginning end attached to the terminal end of said third winding, said terminal end of said fourth winding terminated on a second tab whereby said windings are connected in series to form a single winding set.

4. The assembly according to claim 2 wherein each of said windings further comprises:
    a plurality of radial straight portions, each having inner and outer ends;
    a plurality of inner arcuate portions connected between adjacent radial straight portions at said inner ends; and
    a plurality of outer arcuate portions connected between said radial straight portions so as to connect the outer end of a straight portion to an outer end of an adjacent straight portion.

5. The assembly according to claim 4 wherein said straight and arcuate portions are equal in number in each winding.

6. The assembly according to claim 5 wherein said radial straight portions are equiangularly spaced.

7. The assembly according to claim 6 wherein there are twenty-four radial straight portions, each having a width of less than five degrees.

8. The assembly according to claim 2 wherein each winding is coated with an insulative resin so as to insulate adjacent windings from each other.

9. The assembly according to claim 8 wherein said stator body further comprises:

a first winding set;

a second winding set stacked on and angularly displaced from said first winding set by about twenty degrees; and a third winding set stacked on and angularly displaced from said second winding set by about twenty degrees whereby said straight portions of said windings do not overlap a straight portion of another set.

* * * * *